INVENTORS.
DONALD N. HANSON
CHARLES d'ANCONA HUNT
ATTORNEY.

INVENTORS.
DONALD N. HANSON
CHARLES d'ANCONA HUNT

BY
ATTORNEY.

EQUILIBRIUM CONSTANT FOR $H_2$ IN THE SYSTEM $N_2-H_2$

EQUILIBRIUM CONSTANT FOR $N_2$ IN THE SYSTEM $N_2-H_2$ AT 78°K

INVENTORS.
DONALD N. HANSON
CHARLES d'ANCONA HUNT
BY
ATTORNEY.

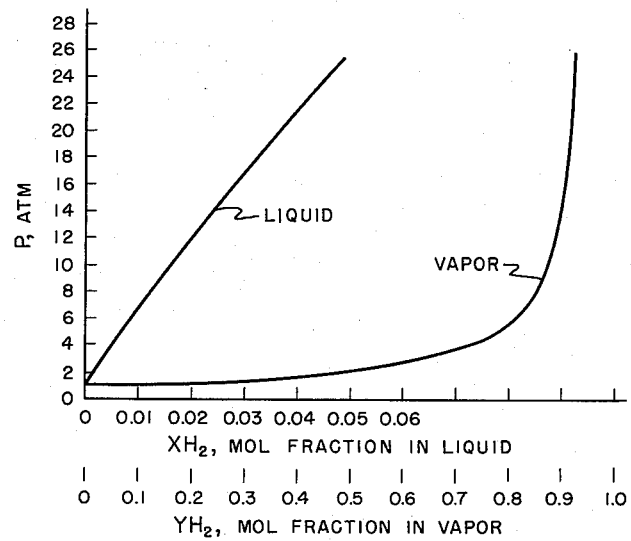
TOTAL PRESSURE VS. COMPOSITION
VAPOR LIQUID EQUILIBRA OF $H_2-N_2$ SYSTEM
AT 78°K
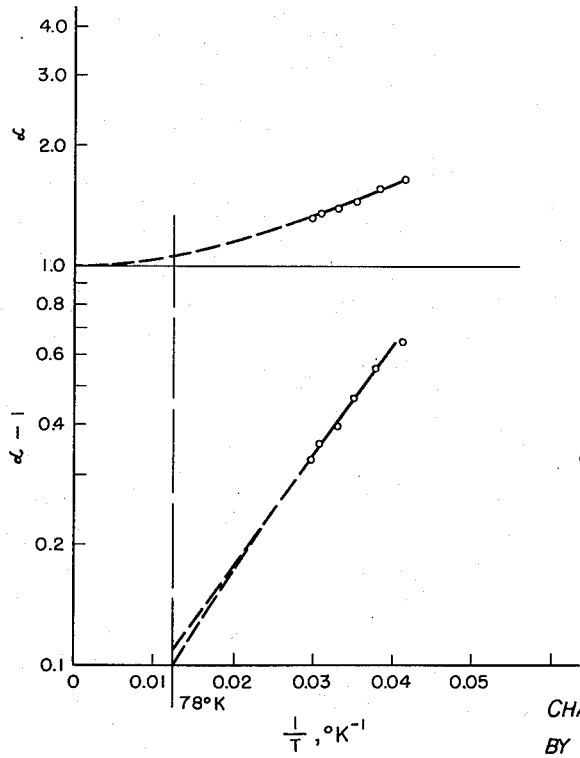
EXTRAPOLATION OF IDEAL RELATIVE
VOLATILITY FOR $H_2-HD$

United States Patent Office 3,004,628
Patented Oct. 17, 1961

3,004,628
RECTIFIED ABSORPTION METHOD FOR THE SEPARATION OF HYDROGEN ISOTOPES
Charles d'Ancona Hunt, Orinda, and Donald N. Hanson, San Francisco, Calif., assignors to the United States of America as represented by the United States Atomic Energy Commission
Filed July 17, 1957, Ser. No. 672,530
11 Claims. (Cl. 183—115)

This invention relates in general to a method for separating the various isotopes of hydrogen and more specifically, to a rectified absorption method for the separation of such isotopes.

The various isotopes of hydrogen are in constantly increasing demand in industry, nuclear and chemical sciences and the heavier isotopes, i.e., tritium and deuterium, are potential fuels for use in the thermonuclear reactors and are used in tracer chemistry, accelerators and the like. Purification and concentration of deuterium and light hydrogen isotopes heretofore has been effected by processes such as electrolysis and multistage distillation of water, by the distillation of liquid hydrogen at very low temperatures, by the catalytic exchange of hydrogen isotopes between liquids and gases and by dual-temperature exchange of hydrogen sulfide and water. Physical separation of the isotopes has also been accomplished in electromagnetic or centrifugal separators, by gaseous difffusion through porous barriers and by thermal diffusion. These methods are variously disadvantageous due to inefficiency, high equipment and operation costs, necessity for complicted equipment, severe operating conditions and attendant difficult engineering obstacles.

On casual contemplation it would appear that simple distillation of liquid hydrogen would be a most promising and economic method of separating hydrogen isotopes; however, in practice very severe difficulties are encountered. Engineering materials are unsatisfactory at such low temperature, it is costly to produce the volumes of liquefied hydrogen required in the multistage cyclic processes which are necessary, and life of the equipment such as pumps is short due to the presence of abrasive solids produced by the freezing of impurity gases such as CO which may be present in usual source hydrogen streams.

The improved method of the persent invention overcomes many of the difficulties of other methods and is characterized by economy and efficiency. The use of commercially standardized and available equipment is practicable, and the essential raw materials are readily available either from primary sources or as by-products of other processes. In this method, the separation of individual isotopes from mixtures thereof is accomplished by the dual continuous and concurrent processes of absorption, i.e., dissolution in solvent and rectification of the isotope mixture from a fluid solvent and is based primarily on the difference in the solubility of the various hydrogen molecules containing light and heavy hydrogen isotopes, i.e., $H_2$ and HD with a minor amount of $D_2$ in a given solvent under specific conditions of temperature and pressure. For convenience in describing the invention the $D_2$ will be included with the HD and HD or hydrogen enriched with HD may be termed "heavy hydrogen gas." Likewise, "light hydrogen gas" will be employed for indicating hydrogen gas depleted in the heavy isotope.

Accordingly, the invention provides several process modifications wherein the heavier hydrogen istopes are separated from those of lighter mass in continuous cyclic processes of absorption in a solvent with subsequent or concurrent selective rectification of the solutions of absorbed gases.

It is therefore a primary object of this invention to provide a method for the separation of mixtures of hydrogen isotopes.

Another object of the invention is to furnish a method whereby hydrogen isotopes are separated in a process wherein heavier isotopes are preferentially absorbed and lighter isotopes are preferentially rectified from a selective solvent.

Still another object is to provide such a method whereby hydrogen gas molecules containing deuterium and/or tritium are separated from mixtures of gas molecules also containing the lighter hydrogen isotope.

A further object is to provide a novel method for concentrating gas molecules containing deuterium and/or tritium in an absorptive solvent therefore.

A still further object is to provide such a novel method by which separation of hydrogen isotopes is achieved efficiently and economically.

Other objects and advantages of the invention will become apparent upon consideration of the following description taken in conjunction with the accompanying drawing of which:

FIGURE 7 is a graphical representation of total pressure vs. composition of vapor-liquid equilibria of the $H_2$—$N_2$ system at 78° K. used in the design of the system described herein; and FIGURE 8 is a graphical representation of the extrapolation of the ideal relative volatility for $H_2$—HD as used in the design of the system described herein.

Ordinarily the process is applied to the separation of heavy hydrogen gas, i.e., deuterium containing gas molecules (HD) from light hydrogen gas, i.e., hydrogen of mass one ($H_2$) contained in normal isotopic content hydrogen gas streams derived from any source. However, partially enriched hydrogen gas from any source can also be used, of course. The hydrogen feed may be produced by electrolysis, water gas reaction, dehydrogenation reactions or any of the multitude of processes wherein hydrogen is produced as a primary product or by-product. Many impurities such CO, $N_2$, lower paraffins, rare gases and other can be tolerated. Ammonia plant, petroleum refinery or Fisher-Tropsch feed streams can be treated by the present process and the exhaust gas thereafter returned to the operation. It is not feasible to process such feed streams particularly those containing the usual amounts of $N_2$ as ordinarily encountered in industrial processes by usual distillation methods. In the rectified absorption method of the invention using $N_2$ as the solvent the $N_2$ content of the feed stream does not interfere since $N_2$ is used as the solvent and the nitrogen-hydrogen ($3H_2$—$N_2$) discharge gas can be returned to the original process, e.g. in an ammonia synthesis plant.

Figure 1:
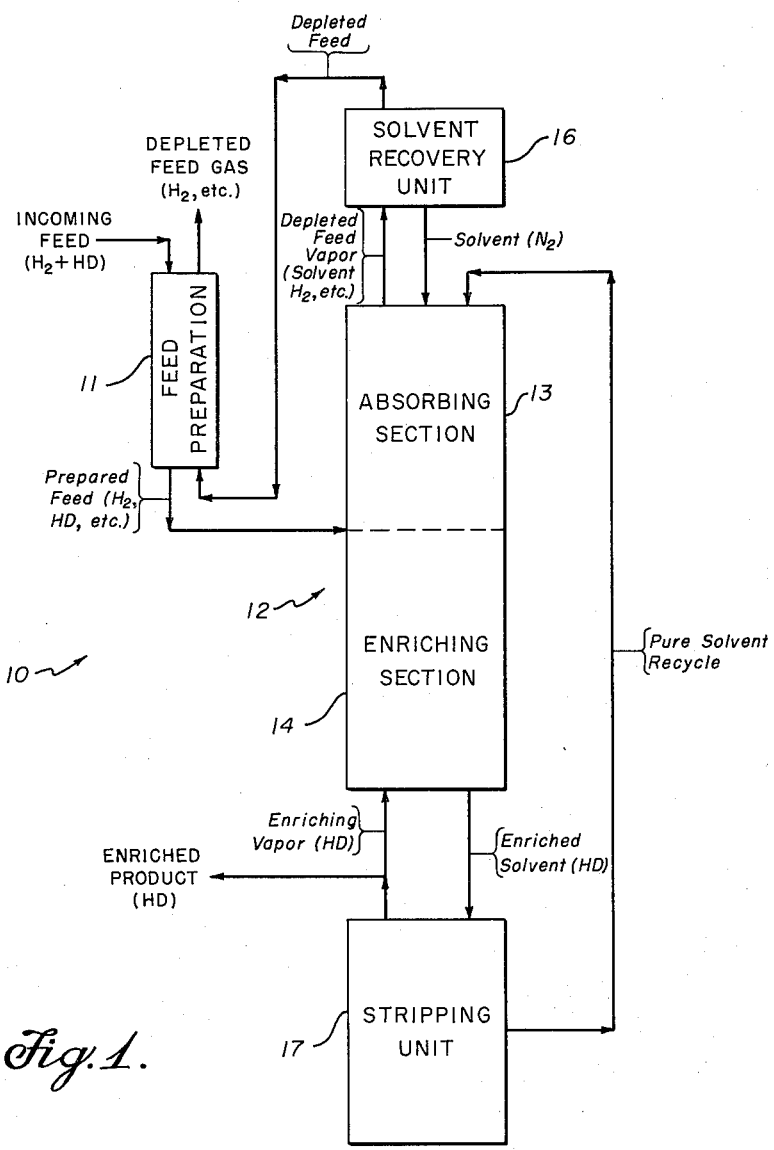
FIGURE 1 is a flow diagram of the basic rectified absorption process showing schematically the various basic stages essential to the process.

An apparatus arrangement 10 adequate for conducting the basic rectified absorption process of the invention is illustrated in FIG. 1 of the drawing. In practice such apparatus arrangement will usually include a feed preparation unit 11, in which a feed stream derived as indicated above, e.g., hydrogen, $N_2$, etc., from an ammonia synthesis plant feed stream, is brought to the appropriate pressure-temperature conditions. Such a unit 11 may be a heat exchanger with pressure control in which exhaust gas from other stages of the process provides at least a portion of the cooling required. The prepared feed stream, e.g., hydrogen containing HD and $N_2$, at least, is center fed into a multistage rectified absorption column 12 having an absorbing section 13 disposed above said centerfeed point and a rectification or enriching section 14 disposed below the centerfeed point. Feed depleted of HD is drawn off from the top of the absorbing section 13 and the solvent, $N_2$, is stripped therefrom in a solvent recovery unit 16, e.g., a reflux condenser head and the depleted feed is discharged therefrom and used for cooling in the feed preparation unit as described above. Recovered solvent or reflux condensate is returned to the top of the absorbing section 13 wherein the solvent passes downward countercurrently to the feed gas selectively absorbing HD from the gas and the absorbate then passes into the enriching section 14 of the column 12 wherein the partially enriched solvent encounters a stream of enriched vapor introduced at the bottom of the column and is thereby further enriched in HD. The enriched solvent is discharged from the bottom of the column 12 into a stripping unit 17 wherein the dissolved feed gas enriched in HD is stripped therefrom and is used as the enriching vapor as described above and the residue thereof combines with the feed stream and is discharged from absorbing section 13 along with depleted feed. A portion of the enriching vapor is taken as the product. Recovered solvent obtained from unit 17 is returned to the top of the absorbing section and is introduced into the top of the absorbing unit as with the reflux condensate described above.

The rectified absorption column 12 may comprise any of the conventional multistage columns used in gas absorption practice which columns are generally packed with various geometrical shapes or are provided with bubble cap plates, etc., to provide efficient contact of gas and liquid. In operation considering said column alone the feed gas traverses the absorbing section countercurrent to the solvent to selectively absorb the HD along with some $H_2$ with the maximum purity of HD being limited by equilibrium between the feed gas and solvent absorbent. With the enriching section added, as described above, this limitation is largely eliminated and a much greater enrichment is obtained. The primary variables to be considered in designing a rectified absorption process are temperature, pressure and relative liquid and vapor flows with reference to particular absorbents. With each practical absorbent optimum conditions are determined by detailed analysis based on phase equilibrium data and with minor modification based on operating experience.

The production of vapor for operating the rectified absorption column can be accomplished in different ways. Essentially the different ways are bounded by or evolve into two extremes, a constant temperature, variable pressure, i.e., isothermal, process and a constant pressure variable temperature process, i.e., isobaric, with a multitude of intermediate combinations being possible.

Figure 2:
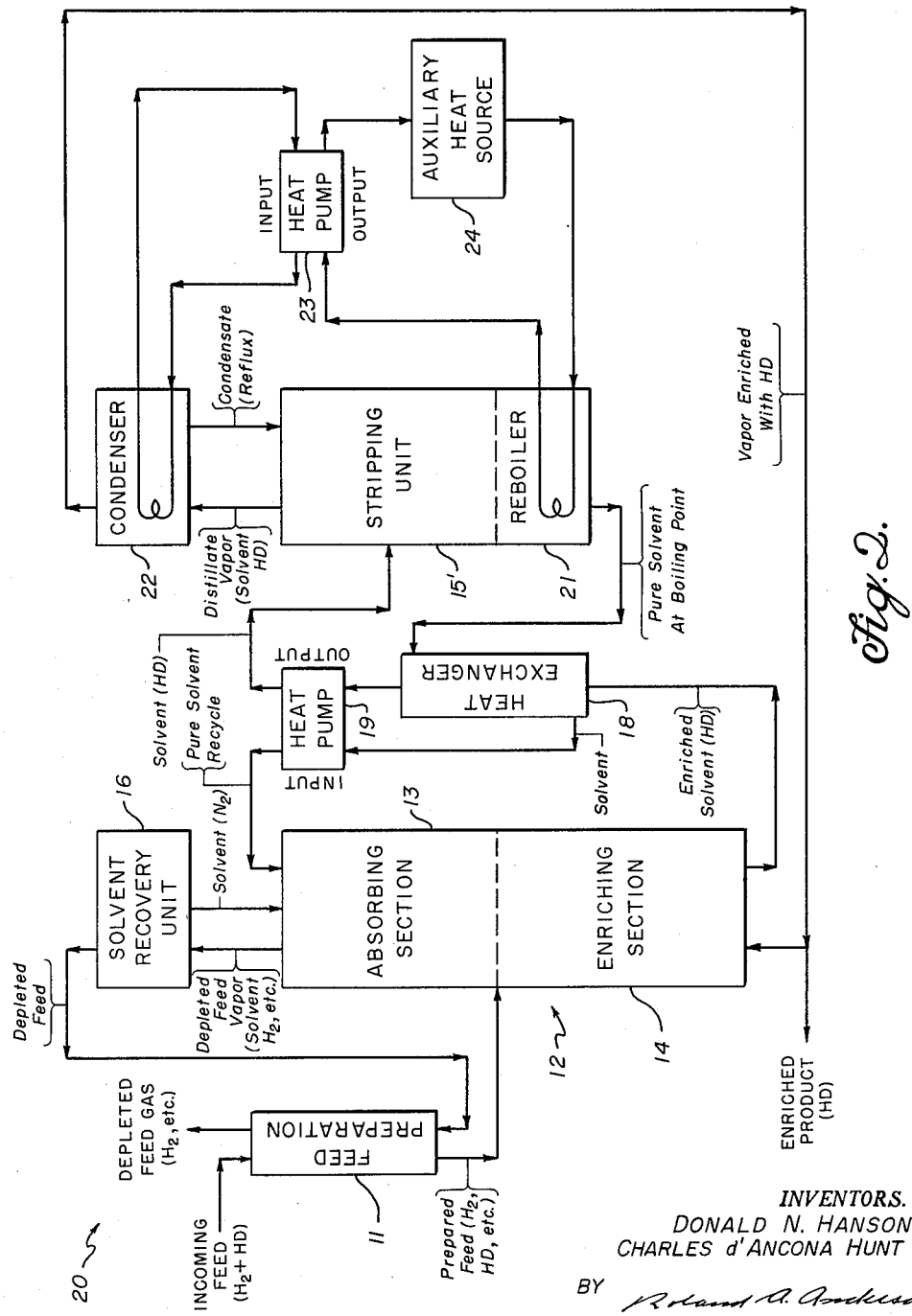
FIGURE 2 is a schematic representation of such a process which is substantially isobaric and operates by means of thermal differentials established between various zones.

In the isobaric (constant pressure, non-isothermal) system the apparatus arrangement 10 of FIG. 1 should be modified to give the arrangement 20 illustrated in FIG. 2 of the drawing. More particularly, basic portions of the arrangement 10 including the feed preparation unit 11, the rectified absorption column 12 and the solvent recovery unit 16 are the same as described above; however, now the solvent enriched with HD and discharged from the enriching section 14 is passed through heat exchanger 18 and the output section of a heat pump 19 to be heated and then introduced into stripping unit 15', which in this case is a distillation column. Hot purified solvent from the reboiler portion 21 of the stripping unit 15' is passed countercurrently through heat exchanger 18 with reference to said enriched solvent and through the input portion of heat pump 19 to supply the heat to said enriched solvent and at the same time be cooled for recycling into said absorbing section 13 as above.

Distillate vapor from stripping unit 15' comprising solvent enriched with HD is discharged from the stripping unit into a reflux condenser head 22 wherein solvent is stripped therefrom yielding vapor enriched with HD which vapor is introduced into the bottom of enriching section 14 of column 12 as described above. Condensate from condenser heat 22 is returned as reflux into stripping unit 15'. The input circuit of a heat pump 23 is coupled to the cooling system of condenser 22 to transport heat given up by condensing vapors therein to the reboiler 21 coupled to the output circuit thereof in order to furnish the heat required to operate the stripping unit 15'. An auxiliary heat source 24 coupled in series in the output circuit of heat pump 23 is employed to furnish additional heat required to operate unit 15'.

With the above isobaric system substantially constant pressure is maintained by regulating the local temperature in the various units in accordance with conventional gas law requirements.

Figure 3:
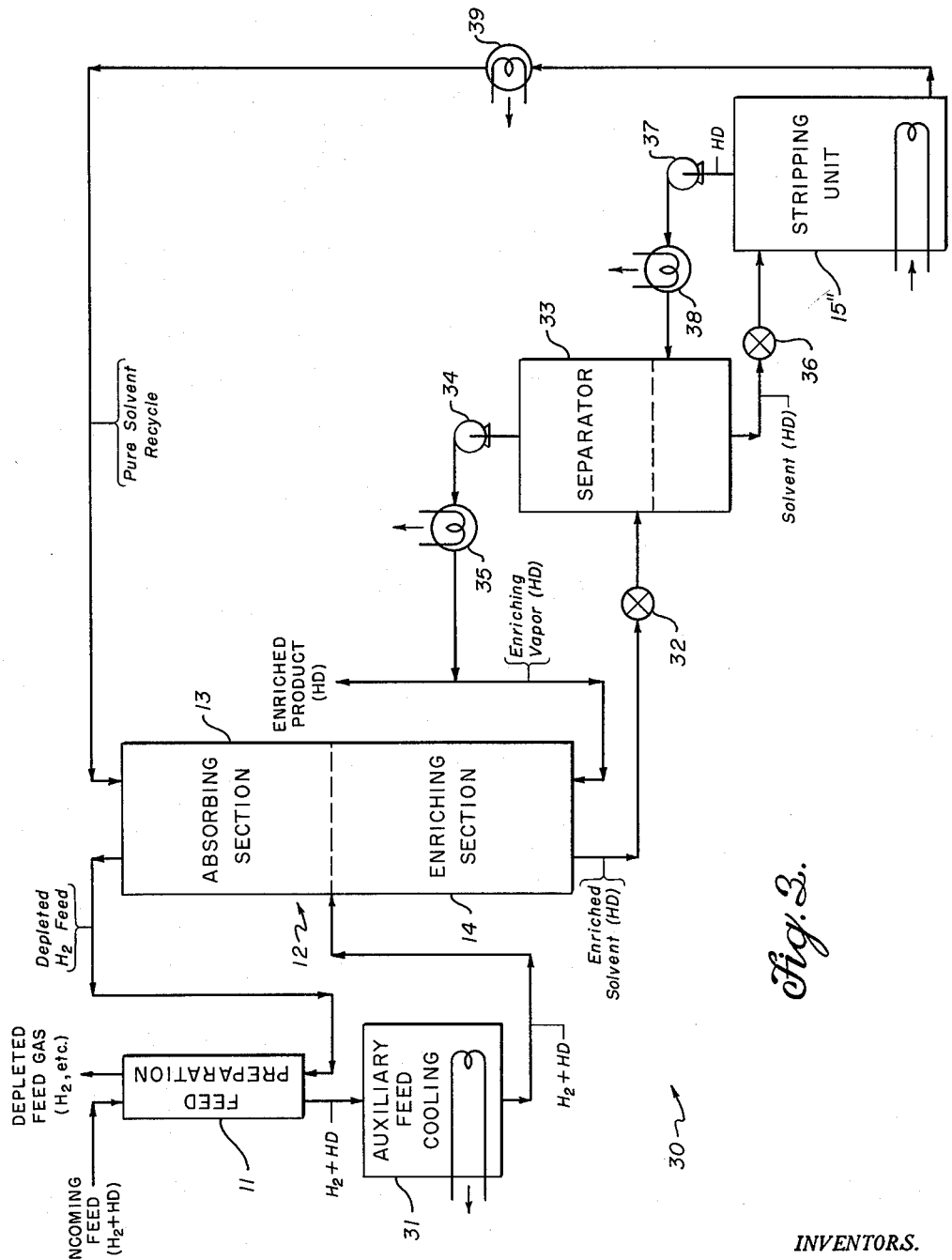
FIGURE 3 is a schematic diagram of a low temperature rectified absorption process having a substantially isothermal, variable pressure stripping section.

With an isothermal process a modified basic apparatus arrangement 30 as illustrated in FIG. 3 of the drawing may be used. Using arrangement 30 the incoming feed gas is cooled to a standard temperature in the feed preparation unit 11 by the cool effluent gases flowing countercurrent thereto from the absorbing section 13 of column 12 and by auxiliary refrigerating means 31. The cooled gases are introduced into the absorbing section 13 of unit 12 where the HD is selectively absorbed by absorbent solvent obtained as described below. The solvent with dissolved HD, i.e., the absorbate passes downward into the enriching section 14 of unit 12 where further concentration of the heavier isotope of unit 12 is accomplished by rectification. The enriched solvent is discharged from the bottom of section 14 through expansion valve 32 where the sudden reduction in pressure vaporizes a portion of the liquid which vaporzied liquid-gas mixture is center fed into separator 33, i.e., a flash still apparatus, located adjacent to the expansion valve 32, wherein the mixture of gas and liquid is separated into the individual components. The gas enriched with HD discharged from the top of the separator is compressed in compressor 34 to a pressure essentially equal to or slightly greater than that of the vapor in the enriching section 14. Regulation of the gas stream temperature, which has been raised by compression, to the normal isothermal temperature is accomplished by passing the stream through regrigerating means 35, and the cooled stream is recycled to the enriching section 14 as the aforesaid enriching vapor. A solvent fraction is withdrawn from the bottom of the separator 33 and is passed through expansion valve 36 to vaporize a portion of the solvent stream yielding a liquid-vapor stream which is passed into the stripping unit 15" constructed to provide a series of practically isothermal throttling expansion stages wherein accompanying gas is separated from the solvent. The gas is withdrawn from unit 15" and, after compression in compressor 37 and cooling by refrigerating means 38, is returned to the lower portion of separator 33. Herein the compressed gas mixes with the enriched solvent in the lower portion of the separator 33 and enriched vapor is discharged therefrom as described above. The residual liquid solvent from the stripping unit 15'' is cooled by refrigerating means 39 and recycled to the top of the absorbing section 13 as noted above.

A typical practical application of the process of the present invention is for the separation of the heavier hydrogen isotope, deuterium, from admixture with normal hydrogen using liquid nitrogen as the solvent. This process can be conviently and economically carried on in conjunction with either an ammonia synthesis or Fischer-Tropsch plant, since the temperature and pressure of the process can be regulated to utilize the unmodified feed streams from these plants. Similar compositions of the vapor in the feed stream and in the rectification-absorption column are maintained by regulation of these operating conditions. It is contemplated that other feed streams noted hereinbefore and other essentially nonpolar solvents including n-heptane, n-perfluoroheptane, 2,2,4-trimethylpentane and carbon disulfide can be used in similar processes by appropriately applying the teachings of the invention. As with the $N_2$ solvent process described hereinafter processes employing the above solvents are employed with pressures ranging from about atmospheric to about 100–150 atmospheres dependent on design conditions and degree of separation desired (number of stages required and the like). It is often desirable to operate near ambient temperature conditions to minimize insulation requirements. However, it is possible to operate at both higher pressures and temperatures and at lower temperatures and pressures. With the latter the separation factors become more effective and a lesser number of stages can be utilized to effect a similar degree of separation.

Figure 4:
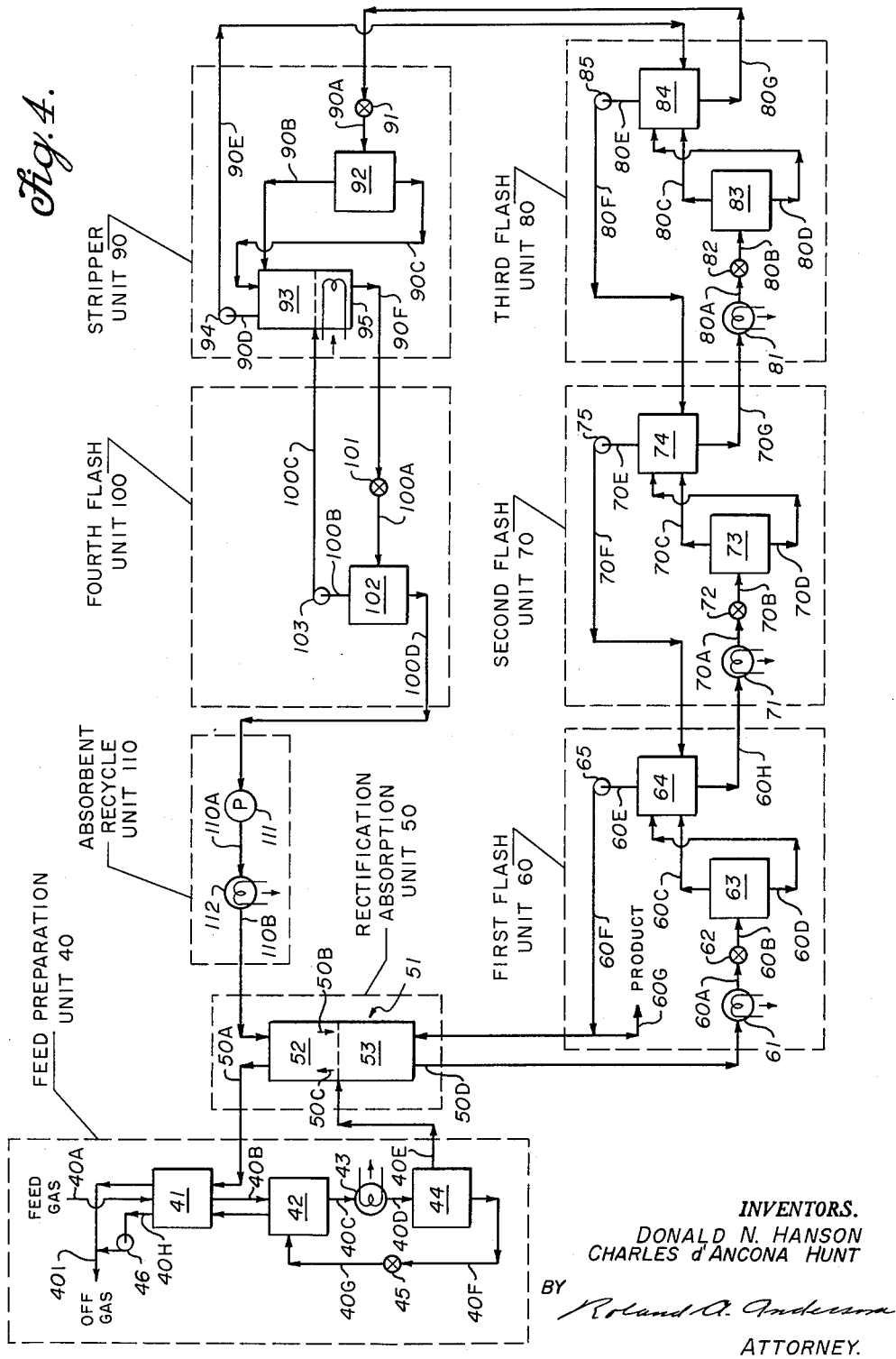
FIGURE 4 is a schematic flow diagram illustrating one embodiment of the invention in which deuterium enriched hydrogen is separated from light hydrogen by rectified absorption in and from liquid nitrogen.

The feed to an ammonia synthesis plant comprises $N_2$ and $H_2$ in the proportions of 1:3 respectively and contains 1 mole of HD per 3500 moles of $H_2$. A unit designed to produce HD enriched to 12.5 mole percent per month equivalent to 800 lbs. (0.4 ton) of $D_2O$ per month requires an approximately 6 foot diameter rectified absorption column, for example, and is constructed with specifications and is operated as described hereinafter. The temperature pressure conditions of such an ammonia feed set the initial conditions at about 25 atmospheres pressure and 308° K. temperature. For economic reasons it is preferred to operate in essentially the isothermal mode. Accordingly, an isothermal plant may be constructed in a tandem cyclic arrangement, as illustrated in FIG. 4 of the drawing, with a series of units including a feed preparation unit 40, a rectified absorption column unit 50, first, second and third flash units 60, 70 and 80, respectively, a stripper unit 90, a fourth flash unit 100 and an absorbent-solvent recycle unit 100.

To simplify the description the terms $YH_2$ or $YN_2$ will be employed to indicate the mole fraction of hydrogen or nitrogen, respectively, in the gas phase at particular points, i.e., stages in the operation. Likewise, $XH_2$ or $XN_2$ will be used to indicate the mole fraction of hydrogen or nitrogen in the liquid phase at particular stages in the operation. For simplicity the term $H_2$ will indicate hydrogen gas irrespective of composition with the understanding that the original and final $H_2$/HD ratios will be specified and the actual composition will vary therebetween in intermediate stages of the operation. The time basis for processing indicated volumes of material is one hour. Also for simplicity approximate operating data for the materials at various points indicated by capital letter symbols at different stages of the flow sheet of FIG. 4 will be tabulated below.

More particularly, the feed preparation unit 40 is designed with a first stage heat exchanger 41 in which the raw feed gas 40A is cooled by countercurrent passage with reference to depleted discharge gas 50A from the rectified absorption unit 50 and refrigerated gas 40G produced as described hereinafter to provide cooled feed gas-solvent ($N_2$) mixture 40B. Cooled feed gas 40B is passed through a second feed preparation heat exchanger 42, is further cooled therein and discharged as mixture 40C and thereafter is cooled even further in a refrigeration system 43 yielding feed gas-fluid phase mixture 40D. Mixture 40D is introduced into phase separator 44 from which fully prepared feed gas 40E is discharged for use in rectified absorption unit 50 and fluid phase 40F is withdrawn, expanded in expansion valve 45 to provide cooled gas 40G which is passed countercurrently to the feed gas in heat exchangers 42 and 41 as described above. On passage through exchanger 41, gas 40G is heated to yield gas 40H which gas 40H is compressed in compressor 46 and admixed with depleted discharge gas 50A for return to the ammonia synthesis plant cycle as gas 40I.

TABLE I

*Feed preparation*

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 40A | 1,078 | .75 | .25 | | | 100 | | 308 | 25 |
| 40B | 1,078 | .77 | .23 | .05 | .95 | 97.2 | 2.8 | 90 | 25 |
| 40C | 1,078 | .90 | .10 | .05 | .95 | 82.3 | 17.7 | 80 | 25 |
| 40D | 1,078 | .92 | .08 | .05 | .95 | 80.9 | 19.1 | 78 | 25 |
| 40E | 868 | .92 | .08 | | | 100 | | 78 | 25 |
| 40F | 210 | | | .05 | .95 | | 100 | 78 | 25 |
| 40G | 210 | .05 | .95 | | | 100 | | 76 | 0.9 |
| 40H | 210 | .05 | .95 | | | 100 | | 303 | 0.9 |
| 40I | 1,077 | .75 | .25 | | | 100 | | 303 | 25 |

Rectified absorption unit 50 comprises essentially a column 51 shown schematically with an upper absorbing section 52 and a lower rectification section 53. The column required herein would be about 6 feet in diameter and capable of about 2,000 g.p.m. of internal flow. The design should incorporate a high weir length to diameter ratio and a quadruple weired or equivalent column may be used to reduce apparatus size required to handle the high liquid to vapor flow ratio employed herein. Absorbing section 52 should be provided with about 50 actual plates operating at an assumed plate efficiency of 40% and the enriching or rectification section 53 with about 100 actual plates. Actual plate efficiencies found in practice, if different, would, of course, modify the indicated number. While the column 51 is indicated as being in one piece it is possible and often desirable to divide the two sections 52 and 53 or to subdivide further and arrange the individual sections side by side into several units and employ pumps and conduits to transfer liquid or gas therebetween as in conventional practice.

In operation prepared feed gas 40E is introduced at the bottom of absorbing section 52 and rises through the plates of such section to countercurrently contact a purified absorbent solvent ($N_2$) stream 110B produced in absorbent recycle unit 110 as described hereinafter. As the feed gas rises therethrough HD is efficiently stripped from the gas by preferential countercurrent multistage absorption and the gas depleted in HD is discharged from the top of column 51 as gas 50A which is employed in heat exchanger 41 as described above. Following passage through section 52, the solvent phase, i.e., the absorbate 50B enters the rectification-enriching section 53 and countercurrently contacts upwardly flowing depleted enriching gas 50C which is introduced into the bottom of said section 53 as enriching gas 60F produced as described below. After undergoing enrichment in an effective countercurrent rectification passage downwards in section 53 the solvent phase is discharged from the bottom thereof as fluid phase 50D having an isotopic concentration ratio of $8H_2$:1HD, essentially the final product composition as described below which is then processed in flash unit 60. Operating data for the rectified-absorption cycle are presented in Table II.

TABLE II

| Point | Moles | Gas | | Liquid | | Mol percent gas | Mol percent liq. | T. °K. | P. atm. |
|---|---|---|---|---|---|---|---|---|---|
| | | $YH_2$ | $YN_2$ | $XH_2$ | $XN_2$ | | | | |
| 40E | 868 | .92 | .08 | | | 100 | | 78 | 25 |
| 110B | 31,600 | | | $10^{-6}$ | ~1.0 | | 100 | 78 | 25 |
| 50A | 867 | .92 | .08 | | | 100 | | 78 | 25 |
| 50B | 33,270 | | | .05 | .95 | | 100 | 78 | 25 |
| 50C | 1,670 | .92 | .08 | | | 100 | | 78 | 25 |
| 50D | 33,325 | | | .05 | .95 | | 100 | 78 | 25 |
| 60F | 1,730 | .92 | .08 | | | 100 | | 78 | 25 |

More particularly, discharged fluid phase 50D is introduced into first flash unit 60 to be passed through heat exchanger 61 fed by a refrigeration unit (not shown) for cooling to a temperature appropriate to provide proper proportions of gas and liquid on expansion of cooled liquid 60A provided thereby at later stages in the process. Liquid phase 60A is passed through expansion valve 62 wherein the pressure is reduced yielding process stream 60B at 12 atmospheres pressure which process stream is introduced into flash vesesl 63 and is expanded at that pressure. Gas 60C produced by the aforesaid expansion is withdrawn from vessel 63 and introduced into the lower level of a gas-liquid contactor column 64 and liquid phase 60D is withdrawn from the bottom of flash vessel 63 and is pumped into an upper level of column 64 to pass downward through several stages in contact with the gas to assure that the two phases are in equilibrium. Equilibrated gas phase 60E is withdrawn from the top of the contactor column 64 and compressed by compressor 65 to provide enriching gas 60F at 25 atm. pressure which is introduced into the bottom of absorbing section 53 of the rectified absorption unit 50 as described above. A proportion of 60F is withdrawn as final product gas 60G which proportion is equivalent to 0.4 ton of $D_2O$ per month or 0.97 mole/hr. of gas having an isotopic ratio of $8H_2:1HD$. Product material is used as is in, i.e., producing deuterated compounds or is enriched further by further distillation or by conversion to $H_2O$ followed by distillation or by other conventional processes. Liquid phase 60H is withdrawn from the bottom of column 64 for processing in second flash unit 70 as described below.

Operating data for the first flash unit 60 are presented in Table III.

TABLE III

| Point | Moles | Gas | | Liquid | | Mol percent gas | Mol percent liq. | T. °K. | P. atm. |
|---|---|---|---|---|---|---|---|---|---|
| | | $YH_2$ | $YN_2$ | $XH_2$ | $XN_2$ | | | | |
| 50D | 33,325 | | | .05 | .95 | | 100 | 78 | 25 |
| 60A | 33,325 | | | .05 | .95 | | 100 | <78 | 25 |
| 60B | 33,325 | | | | | | | 78 | 12 |
| 60C | | .92 | .08 | | | 100 | | 78 | 12 |
| 60D | | | | .05 | .95 | | 100 | 78 | 12 |
| 60E | 1,731 | .92 | .08 | | | 100 | | 78 | 12 |
| 60F | 1,730 | .92 | .08 | | | 100 | | 78 | 25 |
| 60G | .97 | .92 | .08 | | | 100 | | 78 | 25 |
| 60H | 32,340 | | | .0203 | .9747 | | 100 | 78 | 12 |

Fluid phase 60H discharged from the first flash unit 60 is introduced into second similar flash unit 70 to be passed through heat exchanger 71 fed by a refrigeration unit (not shown) for cooling to a temperature appropriate to provide proper proportions of gas and liquid on expansion of cooled liquid 70A, provided thereby, at later states in the process. Liquid phase 70A is passed through expansion valve 72 wherein the pressure is reduced yielding process stream 70B at 6 atmospheres pressure which process stream is introduced into flash vessel 73 and is expanded at that pressure. Gas 70C produced by the aforesaid expansion is withdrawn from vessel 73 and is introduced into the lower level of a gas-liquid contactor column 74 and liquid phase 70D is withdrawn from the bottom of flash vessel 73 and is pumped into an upper level of column 74 to pass downward through several stages in contact with the gas 70C to assure that the phases are in equilibrium. Equilibrated gas phase 70E is withdrawn from the top of column 74 and compressed by compressor 75 to 12 atmospheres pressure to provide gas 70F which is recycled into column 64 of the first flash unit at about the same level as gas 60C. Liquid phase 70G is withdrawn from the bottom of column 74 for processing in third flash unit 80 as described below.

Operating data for second flash unit 70 are presented in Table IV.

TABLE IV

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 60A | 32,340 | | | .0203 | .9747 | | 100 | 78 | 12 |
| 70A | 32,340 | | | .0203 | .9747 | | 100 | <78 | 12 |
| 70B | 32,340 | | | | | | | 78 | 6 |
| 70C | | | | | | 100 | | 78 | 6 |
| 70D | | | | | | | 100 | 78 | 6 |
| 70E | 746 | .883 | .117 | | | 100 | | 78 | 6 |
| 70F | 746 | .883 | .117 | | | 100 | | 78 | 12 |
| 70G | 31,990 | | | .0087 | .9913 | | 100 | 78 | 6 |

Fluid phase 70G discharged from second flash unit 70 is introduced into third similar flash unit 80 to be passed through heat exchanger 81 fed by a refrigeration unit (not shown) for cooling to a temperature appropriate to provide proper proportions of gas and liquid on expansion of cooled liquid 80A, produced thereby, at later stages in the process. Liquid phase 80A is passed through expansion valve 82 wherein the pressure is reduced yielding process stream 80B at 3 atmospheres pressure which process stream is introduced into flash still vessel 83 and is expanded at that pressure. Gas 80C produced by the aforesaid expansion is withdrawn from vessel 83 and introduced into the lower level of a gas-liquid contactor column 84 and liquid phase 80D is withdrawn from the bottom of vessel 83 and is pumped into an upper level of column 84 to pass downward through several stages in contact with the gas 80C to assure that the phases are in equilibrium. Equilibrated gas phase 80E is withdrawn from the top of column 84 and compressed by compressor 85 to 6 atmospheres pressure to provide gas 80F which is recycled into column 74 of the second flash unit at about the same level as gas 70C. Liquid phase 80G is withdrawn from the bottom of column 84 for processing in stripper unit 90 as described below.

Operating data for third flash unit 80 are presented in Table V.

TABLE V

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 70G | 31,990 | | | .0087 | .9913 | | 100 | 78 | 6 |
| 80A | 31,990 | | | .0087 | .9913 | | 100 | <78 | 6 |
| 80B | 31,990 | | | | | | | 78 | 3 |
| 80C | | | | | | 100 | | 78 | 3 |
| 80D | | | | | | | 100 | 78 | 3 |
| 80E | 393 | .635 | .365 | | | 100 | | 78 | 3 |
| 80F | 393 | .635 | .365 | | | 100 | | 78 | 6 |
| 80G | 31,950 | | | .003 | .997 | | 100 | 78 | 3 |

Fluid phase 80G discharged from third flash unit 80 is introduced into stripper unit 90 and expanded through expansion valve 91 to 1.5 atmospheres pressure to provide process stream 90A which process stream is introduced into flash still vessel 92 and expanded at 1.5 atmospheres pressures. Gas phase 90B is withdrawn from the top of vessel 92 and is introduced into upper stage portions of a stripper still column 93 and fluid phase 90C is withdrawn from the bottom of vessel 92 and is pumped into the top portion of column 93 therein to descend to contact the rising gas phase. The stripper column 93 is designed to afford about 10 actual plates for effecting efficient gas-liquid contact and fractionation. Gas phase 90D is withdrawn from the top of column 93 and compressed by compressor 94 to provide gas 90E at 3 atmospheres pressure which is recycled into the lower portion of column 84 at about the same level as gas 80C. Fluid phase 90F is withdrawn from the reboiler kettle portion 95 of the column 93 for processing in fourth flash unit 100 and recycling as described below. The reboiler kettle 95 is supplied with necessary heat by connection with condenser output coils of a refrigeration unit (not shown) having the input coupled to other portions of the process cycle. A considerable economy is effected in this manner.

Operating data for stripper unit 90 are presented in Table VI.

TABLE VI

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 80G | 31,950 | | | .003 | .997 | | 100 | 78 | 3 |
| 90A | 31,950 | | | .003 | .997 | | | <78 | 1.5 |
| 90B | | | | | | 100 | | 78 | 1.5 |
| 90C | | | | | | | 100 | 78 | 1.5 |
| 90D | 358 | .267 | .733 | | | 100 | | 78 | 1.5 |
| 90E | 358 | .267 | .733 | | | 100 | | 78 | 3 |
| 90F | 32,930 | | | ~1.0 | | | 100 | 81 | 1.5 |

Fluid 90F discharged from reboiler kettle 95 of stripper column 93 is introduced into fourth flash unit 100 and expanded through expansion valve 101 to provide process stream 100A at 1.1 atmospheres pressure which process stream 100A is introduced into flash still vessel 102 and expanded at 1.1 atmospheres. Gas phase 100B withdrawn from the top of vessel 102 is compressed by means of compressor 103 to 1.5 atmospheres pressure yielding process stream 100C which is recycled into the lower portion of stripper column 93. Fluid phase 100D which comprises essentially only nitrogen is withdrawn from flash vessel 102 and is processed further in absorbent recycle unit 110 as described below.

Operating data for flash unit 100 are presented in Table VII.

TABLE VII

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 90F | 32,930 | | | ~1.0 | | | 100 | 81 | 1.5 |
| 100A | 32,930 | | | ~1.0 | | | | 78 | 1.1 |
| 100B | 1,333 | ~1.0 | | | | 100 | | 78 | 1.1 |
| 100C | 1,333 | ~1.0 | | | | 100 | | ~81 | 1.5 |
| 100D | 31,600 | | | $10^{-5}$ | ~1.0 | | 100 | 78 | 1.1 |

Fluid phase 100D discharged from the fourth flash unit 100 is introduced into absorbent recycle unit 110 and is pressurized to 25 atmospheres pressure with pump 111 to provide process stream 110A. Process stream 110A is passed through a heat exchanger 112 and is cooled therein to assure that the temperature is at 78° K. and the resultant cooled process stream 110B is recycled to the absorbing section 52 of rectified absorption column 51 as described above. Heat exchanger 112 is cooled by coupling to the evaporator output of a refrigeration system (not shown).

Operating data for absorbent recycle unit 110 are presented in Table VIII.

TABLE VIII

| Point | Moles | $YH_2$ | $YN_2$ | $XH_2$ | $XN_2$ | Mol percent gas | Mol percent liq. | T. °K. | P. atm. |
|---|---|---|---|---|---|---|---|---|---|
| 100D | 31,600 | | | $10^{-6}$ | ~1.0 | | 100 | 78 | 1.1 |
| 110A | 31,600 | | | $10^{-6}$ | ~1.0 | | 100 | | 25 |
| 110B | 31,600 | | | $10^{-6}$ | ~1.0 | | 100 | 78 | 25 |

Figure 5:
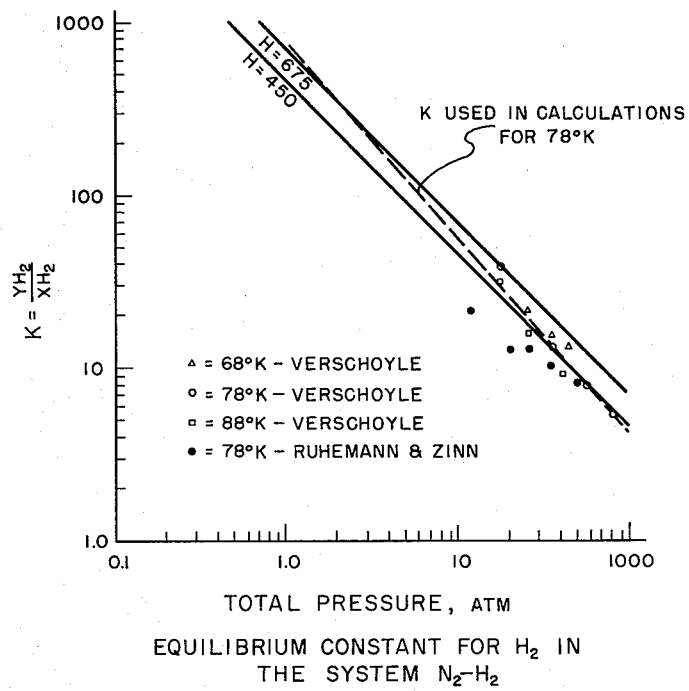
FIGURE 5 is a graphical representation of the equilibrium constant for $H_2$ in the system $N_2$—$H_2$ at various pressures.
Figure 6:
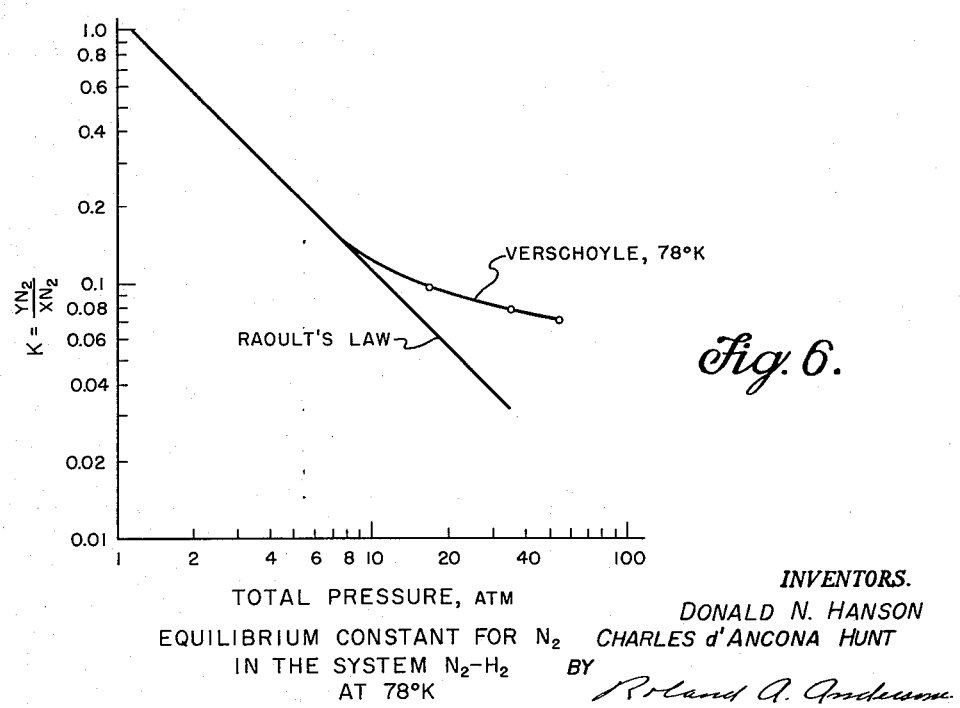
FIGURE 6 is a graphical representation of the derived and extrapolated values of the equilibrium constant for $N_2$ in the system $N_2$—$H_2$ at 78° K. used in calculations of the system described herein.

Design of processes of the present character may be based on published phase data for systems involving $H_2$—HD—$N_2$ such as that of Verschoyle, T.T.H., Trans., Roy. Soc., A, 230, 189 (1931) or M. Ruheman and N. Zinn, Zeit. d. Sowjetunion, 12, 389 (1937) by extrapolation and interpolation. Raoult's law may be used to extrapolate the nitrogen data and Henry's law to extrapolate the hydrogen data as indicated in FIGS. 5 and 6 of the drawing. The design data of FIG. 7 was estimated from the foregoing. Also the ideal relative volatility was extrapolated from the highest temperature at which the system $H_2$—$N_2$ exists (33° K.) to the operating temperature (78° K.) as shown in FIG. 8 yielding an ideal relative volatility of about 1.10. In addition to this relative volatility, due to the difference in extrapolated vapor pressure ratio, there is an additional effect due to the difference in degree of non-ideality of the solutions of $H_2$ in $N_2$ and HD in $N_2$. On the basis of regular solution theory using an ideal relative volatility of 1.10 the calculated relative volatility of $H_2$ to HD in liquid nitrogen is found to be 1.25. Experimental determinations gave reasonably close verification of the data as used in designing the system.

While there have been described in the foregoing what are considered to be preferred embodiments of the invention it is possible to make modifications therein without departing from the teachings of the invention and it is intended to cover all such as fall within the scope of the appended claims.

What is claimed is:

1. In a process for separating hydrogen isotopes from a plant process hydrogen feed stream mixture containing light and heavy gaseous elemental hydrogen isotopes and gaseous nitrogen, the steps comprising passing said mixture through a feed preparation unit to be discharged as a feed stream consisting essentially of gaseous $H_2$, HD and nitrogen at an initial temperature below the critical temperature of said mixture and an initial pressure above the critical pressure so that a portion of said nitrogen exists as a liquid nonpolar solvent in the discharged feed stream, passing the feed stream through a multistage absorption column to discharge from an upper portion thereof and recycle through said feed preparation unit as a coolant, countercurrently passing liquid nitrogen solvent through said column to contact and selectively absorb HD with reduced proportions of $H_2$ from the feed stream and discharge as absorbate from the bottom of the column, passing the absorbate downward through a multistage rectification column to fractionate $H_2$ therefrom and to discharge as fluid phase enriched with HD from the bottom of the column, said $H_2$ being discharged at the top of said column, combining the $H_2$ fraction with the prepared feed in the absorption column, recovering hydrogen gas enriched with HD from the discharged nitrogen solvent phase, and recycling the nitrogen solvent into said absorption column.

2. The process as defined in claim 1 wherein a portion of the product gas enriched in HD is recycled into the lower portion of the rectification column to countercurrently contact descending solvent phase thereby enriching said phase in HD and itself thusly being depleted in HD but being enriched with respect to $H_2$ thereafter finally combining with the $H_2$ fraction which is discharged from the top of the column.

3. In a process for separating hydrogen isotopes from a plant process hydrogen feed stream mixture containing light and heavy gaseous elemental hydrogen isotopes and gaseous nitrogen, the steps comprising passing said mixture through a feed preparation unit to prepare a feed stream consisting essentially of gaseous $H_2$, HD and nitrogen at an initial temperature below the critical temperature of said mixture and an initial pressure above the critical pressure so that a portion of said nitrogen exists as a liquid nonpolar solvent in the discharged feed stream, passing the feed stream through a multistage absorption column to discharge from an upper portion thereof and recycle through said feed preparation unit as a coolant, countercurrently passing liquid nitrogen solvent through said column to contact and selectively absorb HD from the feed stream and discharge as absorbate from the bottom of the column, passing the absorbate downward through a multistage rectification column to fractionate $H_2$ therefrom and to discharge as fluid phase enriched with HD from the bottom of the column, combining the $H_2$ fraction with the prepared feed in the absorption column, recovering hydrogen gas enriched with HD from the discharged nitrogen solvent phase with at least one flash distillation operation conducted at above said initial temperature and pressure but below the critical temperature of the solvent phase, and recycling the nitrogen solvent into said absorption column.

4. In a process for separating hydrogen isotopes from a plant process hydrogen feed stream mixture containing light and heavy gaseous elemental hydrogen isotopes and gaseous nitrogen, the steps comprising passing said mixture through a feed preparation unit to prepare a feed stream consisting essentially of gaseous $H_2$, HD and nitrogen at an initial temperature below the critical temperature of said mixture and an initial pressure above the critical pressure so that a portion of said nitrogen exists as a liquid nonpolar solvent in the discharged feed stream, passing the feed stream through a multistage absorption column to discharge from an upper portion thereof and recycle through said feed preparation unit as a coolant, countercurrently passing liquid nitrogen solvent through said column to contact and selectively absorb HD from the feed stream and discharge as absorbate from the bottom of the column, passing the absorbate downward through a multistage rectification column to fractionate $H_2$ therefrom and to discharge as fluid phase enriched with HD from the bottom of the column, combining the $H_2$ fraction with the prepared feed in the absorption column, recovering hydrogen gas enriched with HD from the discharged nitrogen solvent phase in at least one flash distillation operation conducted at about said initial temperature and at a lower pressure, respectively, and recycling the nitrogen solvent into said absorption column.

5. The process as defined in claim 4 wherein a portion of the product gas enriched in HD is recycled into the lower portion of the rectification column to countercurrently contact descending solvent phase thereby enriching said phase in HD and itself thusly being depleted in HD but being enriched with respect to $H_2$ thereafter finally combining with the $H_2$ fraction which is discharged from the top of the column.

6. In a process for separating hydrogen isotopes from a plant process hydrogen feed stream mixture containing light and heavy gaseous elemental hydrogen isotopes and gaseous nitrogen, the steps comprising passing said mixture through a feed preparation unit to prepare a feed stream consisting essentially of gaseous $H_2$, HD and nitrogen at an initial temperature below the critical temperature and at an initial pressure above the critical pressure so that a portion of said nitrogen exists as a liquid nonpolar solvent in the discharged feed stream, passing the prepared feed stream through a multistage absorption column to discharge from an upper portion thereof and to recycle through the feed preparation unit as a coolant, countercurrently passing liquid nitrogen solvent through the column to contact and selectively absorb HD from the feed stream and to discharge from the bottom of the column, passing the absorbate downward through a multistage rectification column to fractionate $H_2$ therefrom and to discharge as fluid phase enriched in HD from the bottom of the column, combining the $H_2$ fraction with the prepared feed in the absorption column, treating the discharged fluid phase in a plurality of flash distillation stages operated at successively lower pressures and at about said initial temperature to separate therefrom a gas phase enriched in HD, said flash stages being arranged to receive fluid phase from the preceding and to return gas phase enriched in HD to the preceding stage, withdrawing a portion of the gas phase returned from the first of said stages as a product enriched in HD and recycling the remainder as enriching gas phase into the lower portion of the rectification column to countercurrently contact descending fluid phase, stripping residual gas phase from the fluid phase discharged from the last of said flash stages and returning the stripped gas to the last flash stage, and pressurizing and cooling the nitrogen solvent phase from the stripped operation to about the initial temperature and pressure.

7. The process as defined in claim 6 wherein said prepared feed stream comprises nitrogen and hydrogen in the mole ratio of about 3:1.

8. The process as defined in claim 6 wherein said prepared feed stream comprises nitrogen and hydrogen in the mole ratio of about 3:1 and the gaseous mixture is at about 25 atmospheres pressure.

9. The process as defined in claim 6 wherein said prepared feed stream is at an initial temperature of about 78° K. and at an initial pressure of about 25 atmospheres.

10. The process as defined in claim 6 wherein said prepared feed stream is at an initial temperature of about 78° K., said flash stages number three operating at about 12, 6 and 3 atmospheres pressure respectively, and said stripping operation is conducted at about 1.5 atmospheres pressure.

11. The process as defined in claim 6 wherein said prepared feed stream is at an initial temperature of about 78° K., said flash stages number three operating at about 12, 6 and 3 atmospheres pressure respectively, and said stripping operation is conducted at about 1.5 atmospheres pressure, and said stripping operation is supplemented by a flash operation conducted at about 1.1 atmospheres with flashed gas phase being recycled into the stripping stage and the solvent phase being recycled as stated.

References Cited in the file of this patent

UNITED STATES PATENTS

| | | |
|---|---|---|
| 2,596,785 | Nelly et al. | May 13, 1952 |
| 2,685,941 | Kassel | Aug. 10, 1954 |
| 2,689,624 | Davis | Sept. 21, 1954 |
| 2,689,625 | Davis | Sept. 21, 1954 |
| 2,780,526 | Fleck | Feb. 5, 1957 |
| 2,787,335 | Irvine | Apr. 2, 1957 |